United States Patent [19]

Decker

[11] Patent Number: 5,684,513

[45] Date of Patent: Nov. 4, 1997

[54] ELECTRONIC LUMINESCENCE KEYBOARD SYSTEM FOR A PORTABLE DEVICE

[76] Inventor: Mark Randall Decker, 13 Halsey Ave., Petaluma, Calif. 94952

[21] Appl. No.: 502,913

[22] Filed: Jul. 17, 1995

[51] Int. Cl.⁶ ........................................... G09G 5/00
[52] U.S. Cl. ........................ 345/168; 341/22; 364/708.1
[58] Field of Search ................................ 345/168, 169, 345/170, 156, 901, 902, 903; 341/22, 23; 200/313, 314, 317, 310, 315, 316; 364/707, 708.1; 361/681, 680, 683; 359/48, 49, 50; 385/901, 147, 19, 25

[56] References Cited

U.S. PATENT DOCUMENTS

| | | | |
|---|---|---|---|
| 4,177,501 | 12/1979 | Karlin | 362/26 |
| 4,365,120 | 12/1982 | Pounds | 200/5 A |
| 4,365,903 | 12/1982 | Zeller et al. | 400/489 |
| 4,471,189 | 9/1984 | Bacon et al. | 200/159 B |
| 4,489,227 | 12/1984 | Lamarche | 200/314 |
| 4,626,965 | 12/1986 | Gupta et al. | 362/33 |
| 4,772,769 | 9/1988 | Shumate | 200/314 |
| 4,842,378 | 6/1989 | Flasek et al. | 359/48 |
| 5,004,318 | 4/1991 | Ohashi | 385/19 |
| 5,034,602 | 7/1991 | Garcia, Jr. et al. | 341/23 |
| 5,379,201 | 1/1995 | Friedman | 362/191 |
| 5,408,060 | 4/1995 | Muurinen | 200/314 |
| 5,486,984 | 1/1996 | Miller | 385/901 |

Primary Examiner—Xiao Wu
Attorney, Agent, or Firm—Benman Collins & Sawyer

[57] ABSTRACT

An electronic luminescence keyboard system in a portable device which includes a plurality of keypads and an illuminated panel which displays information responsive to the pressing of at least one of the plurality of keypads is disclosed. The improvement comprises a conductor element for conducting a portion of the light from the illuminated panel and illuminator element coupled to the conductor element for illuminating the plurality of keypads with the portion of the light from the illuminated panel. Through the use of a portion of the light from the display panel is utilized to illuminate the keyboard thereby allowing for observation of the keypads on the keyboard when the surrounding area is dimly lit. The ELK system has no effect on the power consumption on the portable device. In an embodiment the ELK system provides for backlighting the keyboard. In a second embodiment the ELK system provides light to a top portion of the keypads.

18 Claims, 3 Drawing Sheets

— 1 —

ELECTRONIC LUMINESCENCE KEYBOARD SYSTEM FOR A PORTABLE DEVICE

FIELD OF THE INVENTION

The present invention relates to an electrical keyboard, and more particularly to a lighted keyboard utilized in a variety of environments.

BACKGROUND OF THE INVENTION

A wide variety of keyboards are utilized for data entry terminals and remote control terminals. More particularly many laptop computers, personal digital assistants, palmtops, color and black-and-white notebooks, subnotebooks, remote teleprompter presenter screen-keyboards, alpha-numeric pager-organizers with keyboard and numeric keypads for portable computers and the like utilize keyboards for inputting of information. One of the issues with portable devices is the use of such devices in environments where there is not sufficient light to see the keys. For example, in an airplane or the like, while using a portable computer, the lights may be turned off or lowered due to the viewing of a movie or the like on the airplane. It would be useful to have an illuminated keyboard which will allow one to actually see the keys when inputting information. Similarly, in a situation where there are several people in a particular room looking at a TV program or the like, in the evening, in which it is determined that most of the normal lights should be turned off, it would similarly be useful to provide a keyboard which is lighted.

There are many lighting arrangements utilized for keyboards. However, these conventional lighting arrangements have the disadvantage of requiring an additional light source which can consume power for illuminating the keypads as well as requiring relatively complex lighting arrangements for providing such illumination.

Accordingly, what is needed is a lighting arrangement for a portable device that includes a keyboard that is low cost, easy to implement, does not consume additional power and is adaptable to existing portable devices. The present invention addresses such a need.

SUMMARY OF THE INVENTION

An electronic luminescence keyboard system in a portable device which includes a plurality of keypads and an illuminated panel which displays information responsive to the pressing of at least one of the plurality of keypads is disclosed. The improvement comprises a conductor element for conducting a portion of the light from the illuminated panel and illuminator element coupled to the conductor element for illuminating the plurality of keypads with the portion of the light from the illuminated panel.

Through the use of a portion of the light from the display panel is utilized to illuminate the keyboard thereby allowing for observation of the keypads on the keyboard when the surrounding area is dimly lit. The ELK system has no effect on the power consumption on the portable device. In an embodiment the ELK system provides for backlighting the keyboard. In a second embodiment the ELK system provides light to a top portion of the keypads.

DETAILED DESCRIPTION

The present invention relates to a an improvement in the lighting of a keyboard in a portable device which includes a keyboard. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
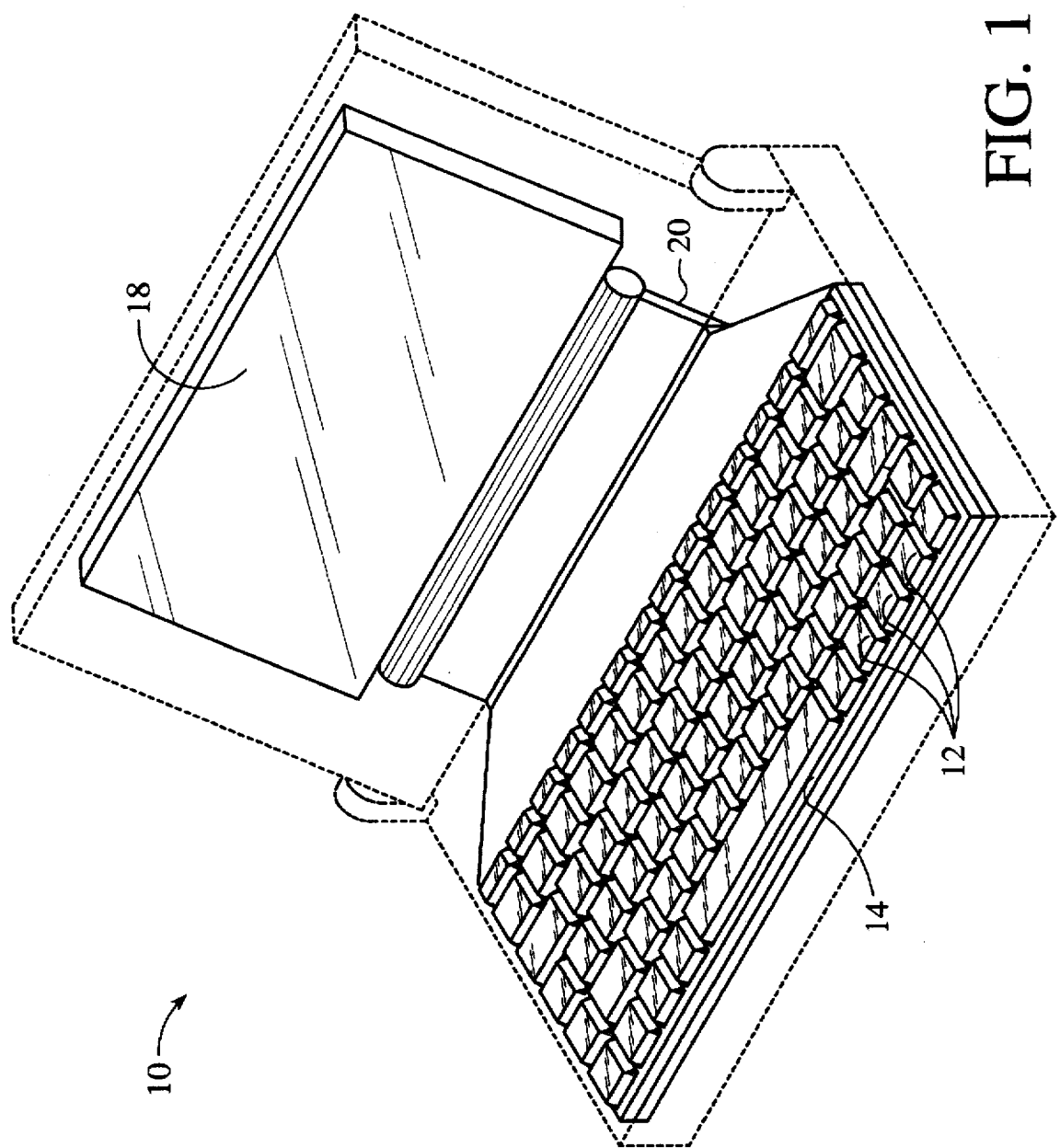
FIG. 1 is a perspective view of an electronic luminescence keyboard system in accordance with the present invention.

Referring now to FIG. 1, what is shown is a perspective view of a portable computer 10 including keypads 12 on a keyboard 14. The portable computer 10 also includes display panel 18 which utilizes the electronic luminescence keyboard (ELK) 20 system of the present invention. The keypads when pressed are utilized to provide images on the display panel. The computer 10 is shown for illustrative purposes only. It is well understood that the ELK system 20 could be utilized in conjunction with any type of portable device which includes a plurality of keypads 12 such as a personal digital assistant, a game player, or any other type of device. The critical feature is that the device has some sort of display panel. The ELK system 20 utilizes the existing light source, i.e., the panel display 18, as the lighting element for the plurality of keypads. Through this cooperation of elements, the plurality of keypads can be illuminated while the device is being utilized in an area where the normal lighting is decreased.

Figure 2:
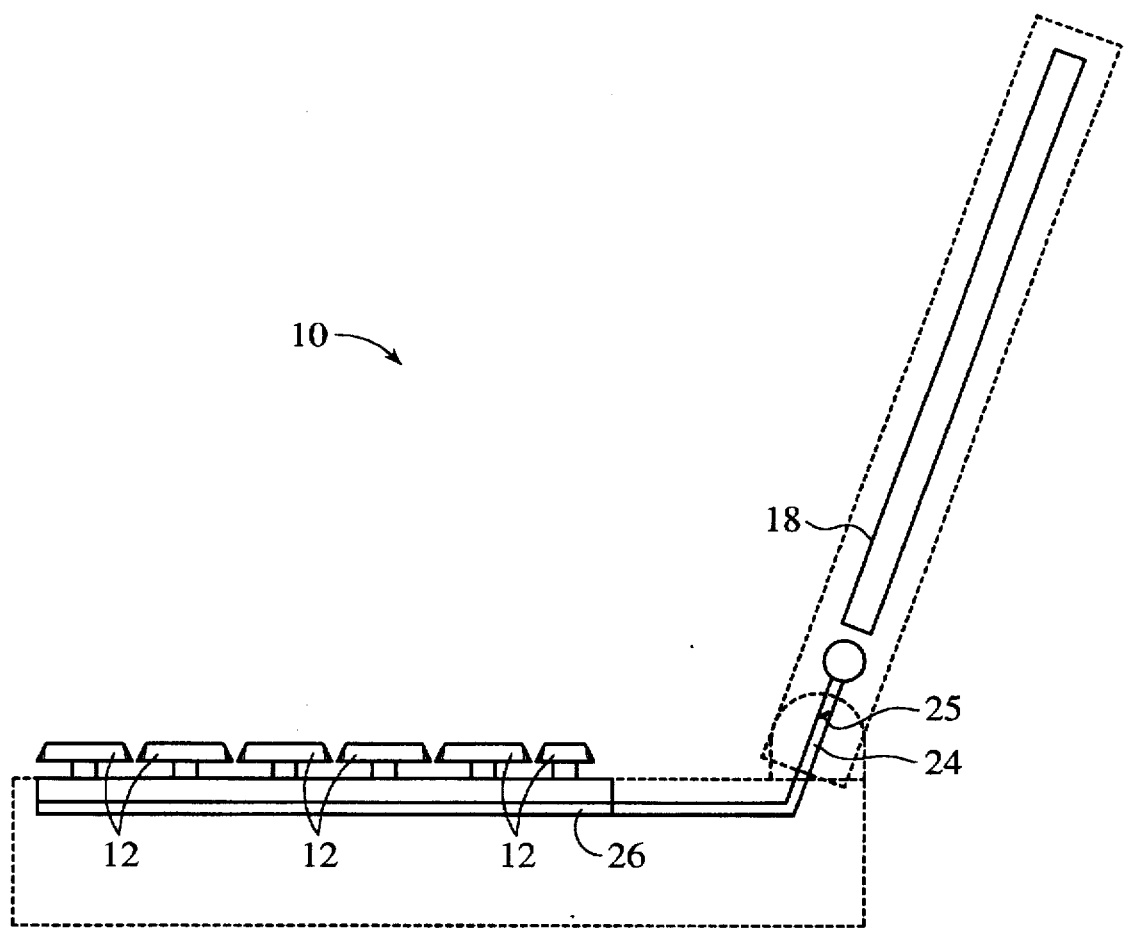
FIG. 2 is a side view of a first embodiment of such a system.

To more specifically describe the present invention, refer now to FIG. 2, which is a side cutaway view of one embodiment of the present invention. As is seen in this embodiment, in the ELK system 20, a portion of the light is piped via a light pipe coupler 24 from the display panel 18 to the underside of the plurality of keypads via a light transparent support plane or backlight panel 26. A portion of the light from the display panel 18 is then utilized to illuminate the back of the plurality of keypads 12 in the backlight panel 26.

Applicant has noted that there are two different scenarios present when utilizing such portable devices. One scenario is where the ambient (surrounding) light is high. In that environment, the light from the display panel 18 must be at a high level to provide the contrast to allow for reading of the display. The second scenario is where the ambient light is low. In that environment, the light from the display panel 18 can be reduced because the contrast between the display panel 18 and the ambient light is high enough that the display panel 18 can be read with a significant reduction of the light produced thereby.

In one embodiment, a gate 25 can be placed in the light pipe coupler 24 which can be moved to various positions to selectively allow or prevent light from entering the backlight panel 26. The gate 25 can be operated either manually or automatically. It should be readily recognized that the gate 25 can be implemented in a variety of ways and those implementations would be within the spirit and scope of the present invention.

Figure 3:
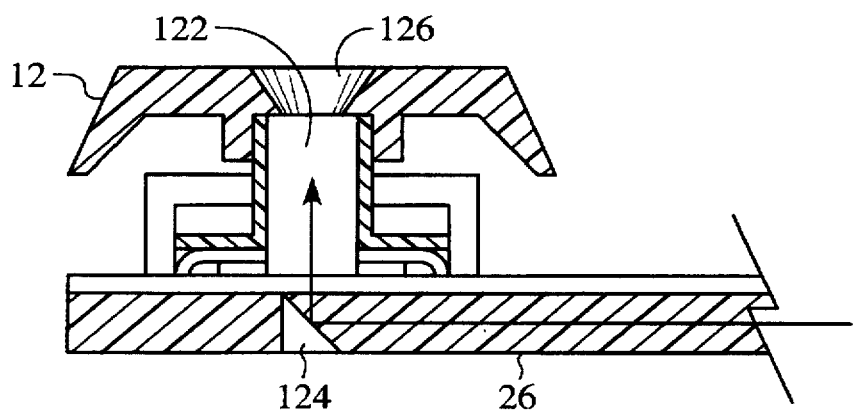
FIG. 3 is a view of one key utilized in such a system.

To illustrate clearly how the system 20 shown in FIG. 2 is utilized on a single keypad 12, refer now to FIG. 3 which shows a keypad which includes a hollow portion 122 for receiving the light from backlight panel 26. The light is then reflected as is seen off reflective member 124 up through the hollow portion 122 of the keypad 12. The keypad in turn has a translucent portion 126 to which the light can be observed. Accordingly, the light from the display panel 18 is used advantageously to provide luminescence to each of the plurality of keypads 12. Heretofore most all previously known systems for providing luminescence to a plurality of keypads have utilized an electronic light source for providing the lighting to a keypad. The present invention uses lighting of the display panel 18 to provide the illumination to the plurality of keypads 12.

One of ordinary skill in the art readily recognizes that the ELK system 20 shown in FIGS. 2 and 3 is but one embodiment of a system which could advantageously utilize the light source of the display panel 18 for illuminating the keypad.

Figure 4:
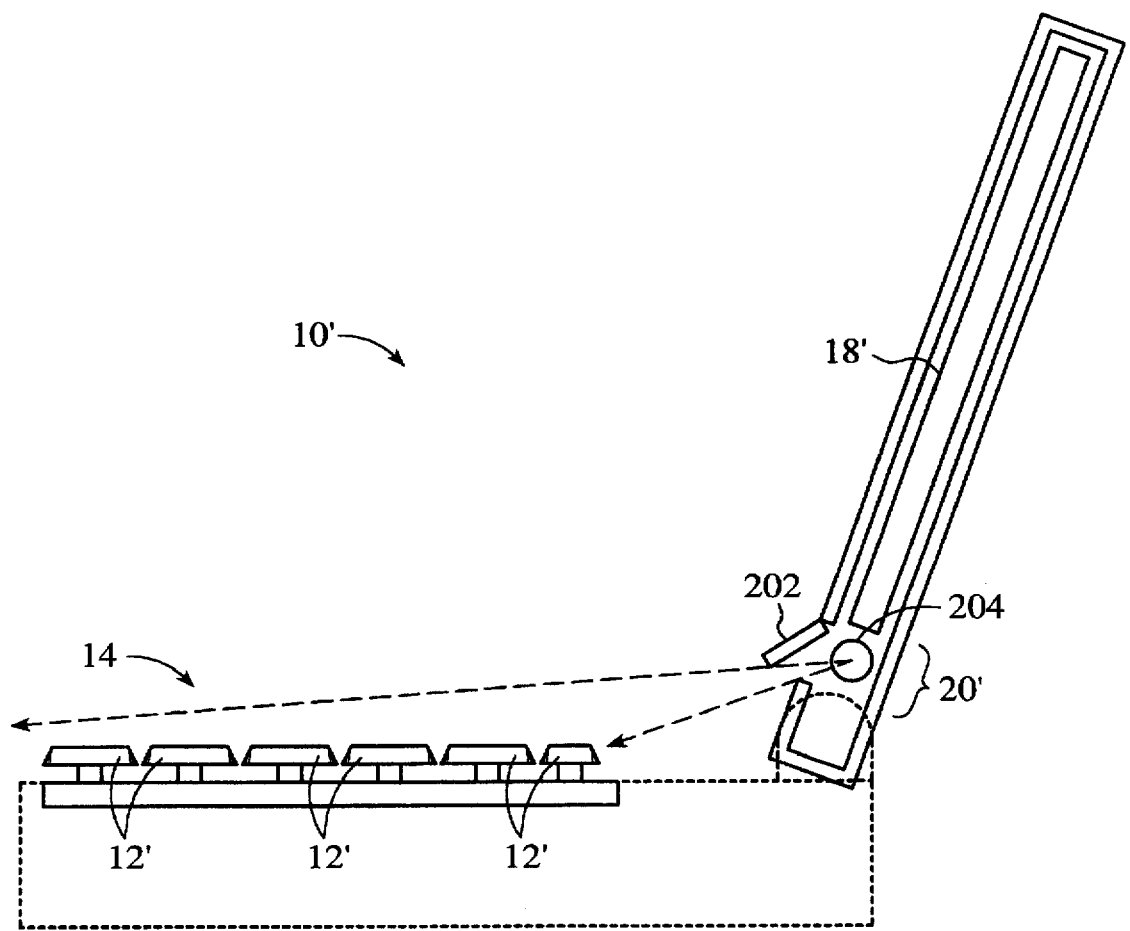
FIG. 4 is a second embodiment of an electronic luminescence keyboard system in accordance with the present invention.

To more particularly show another embodiment, refer now to FIG. 4, which is a partially cut away view of a portable computer 10'. In this embodiment rather than piping the light to the backside of the plurality of keypads 12, the ELK system 20' reflects a portion of the light from the display panel 18" to the top of the plurality of keypads 12 through the use of reflecting member 202 in combination with a light coupler 204. Through the combination of the light coupler 204 and the reflecting member 202 the top of the plurality of keypads 12' are illuminated. This system provides light to the keyboard 14 with minimal modification to the portable device.

Accordingly, as is seen a simple and inexpensive system for providing lighting to a keyboard is provided by actually utilizing the light generated by a device associated with the keyboard. In so doing, a portable device can be used in a variety of environments in which the surrounding environment is not well lit without adding undue cost and expense to the device system. In addition since the ELK system utilizes the existing light source on the device associated with the keypad, the ELK system does not affect the power consumption of the device.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined solely by the following claims.

I claim:

1. In a portable device which includes a plurality of keypads and a panel which is illuminated by a light source within the panel, the panel displaying information responsive to the pressing of at least one of the plurality of keypads; the panel being rotatable from the plurality of keypads, an electronic luminescence keyboard (ELK) system comprising:

a conductor element for conducting a portion of the light from the light source; and illuminator element coupled to the conductor element for illuminating the plurality of keypads with the portion of the light from the light source.

2. The ELK system of claim 1 in which the conductor element comprises a conducting light pipe.

3. The ELK system of claim i in which the conductor element includes a gate means for selectively allowing the light to the illuminator element.

4. The ELK system of claim 1 in which the illuminator element comprises a reflective element.

5. In a device which includes a plurality of keypads and a panel which is illuminated by a light source within the panel, the panel displaying information responsive to the pressing of at least one of the plurality of keypads; the panel being rotatable from the plurality of keypads, an electronic luminescence keyboard (ELK) system comprising:

conductor element coupled to the illuminated panel to conduct a portion of the light from the light source; and a light transparent support plane coupled to the conductor element and located underneath the plurality of keypads for illuminating the keypads with the portion of the light from the light source.

6. The ELK system of claim 5 in which the conductor element comprises a conducting light pipe.

7. The ELK system of claim 5 in which the conductor element includes a gate means for selectively allowing the light to the illuminator element.

8. The ELK system of claim 5 in which the light transparent support plane comprises a backlight plane.

9. In a portable device which includes a plurality of keypads a panel which is illuminated by a light source within the panel displaying information responsive to the pressing of at least one of the plurality of keypads, the panel being rotatable from the plurality of keypads; an electronic luminescence keyboard (ELK) system comprising:

conductor element coupled to the light source to conduct a portion of the light therefrom; and a panel member coupled to the illuminated panel for reflecting the portion of the light from the light source on a top surface of the keypads.

10. The ELK system of claim 9 in which the conductor element comprises a conducting light pipe.

11. The ELK system of claim 9 in which the conductor element includes a gate means for selectively allowing the light to the illuminator element.

12. The ELK system of claim 9 in which the panel member comprises a reflective plane member.

13. A portable device comprising:

a plurality of keypads;

a light source;

a panel being illuminated by the light source, the light source being within the panel, the panel displaying information responsive to the pressing of at least one of the plurality of keypads, the panel being rotatable from the plurality of keypads;

a conductor element for conducting a portion of the light from the light source; and illuminator element coupled to the conductor element for illuminating the plurality of keypads with the portion of the light from the light source.

14. The portable device of claim 13 in which the conductor element comprises a conducting light pipe.

15. The portable device of claim 13 in which the illuminated element comprises a reflective element.

16. The ELK system of claim 13 in which the conductor element includes a gate means for selectively allowing the light to the illuminator element.

17. The portable device of claim 13 in which the illuminator element comprises a light transparent support plane.

18. The portable device of claim 17 in which the light transparent support plane is a backlight plane.

* * * * *